United States Patent
Jacobson et al.

(10) Patent No.: US 9,594,637 B2
(45) Date of Patent: *Mar. 14, 2017

(54) DEPLOYING PARALLEL DATA INTEGRATION APPLICATIONS TO DISTRIBUTED COMPUTING ENVIRONMENTS

(71) Applicant: International Business Machines Corporation, Armonk, NY (US)

(72) Inventors: Eric A. Jacobson, Arlington, MA (US); Yong Li, Newton, MA (US); Shyam R. Mudambi, Wayland, MA (US); Xiaoyan Pu, Chelmsford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 503 days.

This patent is subject to a terminal disclaimer.

(21) Appl. No.: 14/224,640

(22) Filed: Mar. 25, 2014

(65) Prior Publication Data

US 2014/0281704 A1 Sep. 18, 2014

Related U.S. Application Data

(63) Continuation of application No. 13/842,960, filed on Mar. 15, 2013, now Pat. No. 9,323,619.

(51) Int. Cl.
*G06F 9/48* (2006.01)
*G06F 9/50* (2006.01)
*G06F 11/14* (2006.01)

(52) U.S. Cl.
CPC ........ *G06F 11/1415* (2013.01); *G06F 9/5066* (2013.01); *G06F 9/4881* (2013.01); *G06F 9/5027* (2013.01); *G06F 9/5038* (2013.01)

(58) Field of Classification Search
CPC .... G06F 9/5066; G06F 9/5027; G06F 9/5038; G06F 9/4881; G06F 11/1415
See application file for complete search history.

(56) References Cited

U.S. PATENT DOCUMENTS

| 5,752,030 A | 5/1998 | Konno et al. |
| 5,857,180 A | 1/1999 | Hallmark et al. |

(Continued)

FOREIGN PATENT DOCUMENTS

| CN | 101799809 A | 8/2010 |
| CN | 102063336 A | 5/2011 |
| JP | 2012118669 A | 6/2012 |

OTHER PUBLICATIONS

Patent Cooperation Treaty, Search Report and Written Opinion for International Application No. PCT/IB2014/059199, dated May 27, 2014.

(Continued)

*Primary Examiner* — Abdullah Al Kawsar
(74) *Attorney, Agent, or Firm* — Patterson+Sheridan, LLP

(57) ABSTRACT

System, method, and computer program product to process parallel computing tasks on a distributed computing system, by computing an execution plan for a parallel computing job to be executed on the distributed computing system, the distributed computing system comprising a plurality of compute nodes, generating, based on the execution plan, an ordered set of tasks, the ordered set of tasks comprising: (i) configuration tasks, and (ii) execution tasks for executing the parallel computing job on the distributed computing system, and launching a distributed computing application to assign the tasks of the ordered set of tasks to the plurality of compute nodes to execute the parallel computing job on the distributed computing system.

4 Claims, 8 Drawing Sheets

(56) References Cited

U.S. PATENT DOCUMENTS

| | | | |
|---|---|---|---|
| 5,996,088 | A | 11/1999 | Frank et al. |
| 6,434,664 | B1 | 8/2002 | Buch et al. |
| 6,549,928 | B1 | 4/2003 | Mason et al. |
| 6,584,581 | B1 | 6/2003 | Bay et al. |
| 6,654,907 | B2 | 11/2003 | Stanfill et al. |
| 6,725,211 | B1 | 4/2004 | Ashton et al. |
| 6,983,234 | B1 | 1/2006 | Hangal et al. |
| 7,337,444 | B2 | 2/2008 | Browning et al. |
| 7,664,940 | B2 | 2/2010 | Conklin et al. |
| 7,769,717 | B2 | 8/2010 | Federwisch et al. |
| 7,873,719 | B2 | 1/2011 | Bishop et al. |
| 7,895,474 | B2 | 2/2011 | Collins et al. |
| 8,015,541 | B1 | 9/2011 | Srinivasan et al. |
| 8,015,564 | B1 | 9/2011 | Beyer et al. |
| 8,129,848 | B2 | 3/2012 | Lee |
| 8,166,479 | B2 | 4/2012 | Roberts et al. |
| 8,219,848 | B2 | 7/2012 | Branson et al. |
| 8,224,986 | B1 | 7/2012 | Liskov et al. |
| 8,266,477 | B2 | 9/2012 | Mankovskii et al. |
| 8,572,051 | B1 | 10/2013 | Chen et al. |
| 8,825,599 | B2 | 9/2014 | Goldberg et al. |
| 2002/0055868 | A1 | 5/2002 | Dusevic et al. |
| 2002/0152432 | A1 | 10/2002 | Fleming |
| 2002/0188653 | A1 | 12/2002 | Sun |
| 2002/0194248 | A1 | 12/2002 | Wood et al. |
| 2003/0135621 | A1 | 7/2003 | Romagnoli |
| 2005/0188364 | A1 | 8/2005 | Cockx et al. |
| 2006/0080285 | A1 | 4/2006 | Chowdhuri |
| 2006/0136279 | A1 | 6/2006 | Maybee et al. |
| 2006/0156157 | A1 | 7/2006 | Haselden et al. |
| 2006/0294435 | A1 | 12/2006 | Vick et al. |
| 2007/0067373 | A1 | 3/2007 | Higgins et al. |
| 2007/0094214 | A1 | 4/2007 | Li et al. |
| 2007/0266368 | A1 | 11/2007 | Szpak et al. |
| 2007/0266384 | A1 | 11/2007 | Labrou et al. |
| 2008/0263555 | A1 | 10/2008 | Ventroux et al. |
| 2008/0307255 | A1 | 12/2008 | Chen et al. |
| 2009/0007127 | A1 | 1/2009 | Roberts et al. |
| 2009/0187756 | A1 | 7/2009 | Nollet et al. |
| 2009/0260009 | A1 | 10/2009 | Pinto et al. |
| 2009/0265707 | A1 | 10/2009 | Goodman et al. |
| 2010/0122065 | A1 | 5/2010 | Dean et al. |
| 2010/0205619 | A1 | 8/2010 | Barsness et al. |
| 2010/0241828 | A1 | 9/2010 | Yu et al. |
| 2011/0016214 | A1 | 1/2011 | Jackson |
| 2011/0016354 | A1 | 1/2011 | Douros et al. |
| 2011/0061057 | A1 | 3/2011 | Harris et al. |
| 2011/0078499 | A1 | 3/2011 | Fong et al. |
| 2011/0145392 | A1 | 6/2011 | Dawson et al. |
| 2011/0145830 | A1 | 6/2011 | Yamaguchi |
| 2011/0154341 | A1 | 6/2011 | Pueyo et al. |
| 2011/0173289 | A1 | 7/2011 | Chen et al. |
| 2011/0173488 | A1 | 7/2011 | Blumrich et al. |
| 2011/0238797 | A1 | 9/2011 | Wee |
| 2011/0302583 | A1 | 12/2011 | Abadi et al. |
| 2012/0011401 | A1 | 1/2012 | Ranganathan et al. |
| 2012/0079497 | A1 | 3/2012 | Gangemi et al. |
| 2012/0102189 | A1 | 4/2012 | Burge et al. |
| 2012/0151198 | A1 | 6/2012 | Gupta et al. |
| 2012/0304003 | A1 | 11/2012 | Goldstein et al. |
| 2012/0317579 | A1 | 12/2012 | Liu |
| 2013/0247069 | A1 | 9/2013 | Chen et al. |
| 2014/0040855 | A1 | 2/2014 | Wang et al. |
| 2014/0059552 | A1 | 2/2014 | Cunningham et al. |
| 2014/0208169 | A1 | 7/2014 | Randhir et al. |
| 2014/0215471 | A1 | 7/2014 | Cherkasova et al. |
| 2014/0280159 | A1 | 9/2014 | Cao et al. |
| 2014/0280441 | A1 | 9/2014 | Jacobson et al. |
| 2014/0282563 | A1 | 9/2014 | Jacobson et al. |
| 2014/0282604 | A1 | 9/2014 | Jacobson et al. |
| 2014/0282605 | A1 | 9/2014 | Jacobson et al. |
| 2014/0359624 | A1 | 12/2014 | Cherkasova et al. |
| 2014/0372611 | A1 | 12/2014 | Matsuda et al. |
| 2015/0052530 | A1 | 2/2015 | Jacobson et al. |
| 2015/0074669 | A1 | 3/2015 | Jacobson et al. |

OTHER PUBLICATIONS

Ferkouss, Omar El et al., Performance model for mapping processing tasks to OpenFlow switch resources, 2012 IEEE International Conference on Communications, Jun. 2012, IEEE, Piscataway, United States, 6 pages.

Kirischian, Lev, Optimization of Parallel Task Execution on the Adaptive Reconfigurable Group Organized Computing System, Proceedings of the International Conference on Parallel Computing in Electrical Engineering, 2000, IEEE, Piscataway, United States, 1 page.

Wang, Bo et al., Task optimization based on CPU pipeline technique in a multicore system, Computers & Mathematics with Applications, Jan. 2012, vol. 63, Issue 2, Pergamon Press, Inc., Tarrytown, United States, 1 page.

Vandierendonck, Hans et al., Parallel Programming of General-Purpose Programs Using Task-Based Programming Models, Proceedings of the 3rd USENIX conference on Hot topic in parallelism, 2011, USENIX Association, Berkeley, United States, 6 pages.

Varisteas, Georgios, et al., Resource management for task-based parallel programs over a multi-kernel, Proceedings of the 2012 workshop on Runtime Environments, Systems, Layering and Virtualized Environments, 2012, Association for Computing Machinery (ACM), New York, United States, 7 pages.

U.S. Appl. No. 13/966,903, entitled "Task-Based Modeling for Parallel Data Integration", filed Aug. 14, 2013.

U.S. Appl. No. 14/485,362, entitled "Task-Based Modeling for Parallel Data Integration", filed Sep. 12, 2014.

U.S. Appl. No. 14/224,523, entitled "Qualified Checkpointing of Data Flows in a Processing Environment", filed Mar. 25, 2014.

U.S. Appl. No. 13/842,960, entitled Deploying Parallel Data Integration Applications to Distributed Computing Environments, filed Mar. 15, 2013.

U.S. Appl. No. 13/843,425, entitled Qualified Checkpointing of Data Flows in a Processing Environment, filed Mar. 15, 2013.

U.S. Appl. No. 13/842,484, entitled Data Integration on Retargetable Engines in a Networked Environment, filed Mar. 15, 2013.

Anonymous, Methods for Application Checkpointing using Application Dependence Analysis, IP.com: Prior Art Database, Oct. 16, 2012, ip.com, Fairport, United States.

Motorola et al., Selective Session Recovery Based on Domain Specific Prioritization Criteria, IP.com: Prior Art Database, Feb. 21, 2012, ip.com, Fairport, United States.

Anonymous, Optimal checkpoint interval based on intelligent model using database interval factors, IP.com: Prior Art Database, Feb. 3, 2012, ip.com, Fairport, United States.

Various Universities, On the Optimum Checkpoint Selection Problem, IP.com: Prior Art Database, Mar. 29, 2007, ip.com, Fairport, United States.

DEPLOYING PARALLEL DATA INTEGRATION APPLICATIONS TO DISTRIBUTED COMPUTING ENVIRONMENTS

CROSS-REFERENCE TO RELATED APPLICATION

This application is a continuation of U.S. patent application Ser. No. 13/842,960, filed Mar. 15, 2013, now issued U.S. Pat. No. 9,323,619. The aforementioned related patent application is herein incorporated by reference in its entirety.

BACKGROUND

The present disclosure relates to computer software. More specifically, embodiments disclosed herein relate to deploying parallel data integration applications to distributed computing environments.

An existing parallel execution environment for data integration may take one of four configurations: symmetric multiprocessing (SMP), massive parallel processing (MPP), cluster, or grid. SMP contains one physical server, while the other parallel execution environments support multiple physical servers. Those servers may be further configured to serve as compute nodes, I/O nodes, or database nodes. With limited available resources, jobs (data integration applications) cannot always run whenever they need to—they must be scheduled via a job scheduler or managed via a workload manager to share system resources so as to prevent the system from being overloaded. The end result is that jobs may have to spend time waiting on resources, which delays its end-to-end execution cycle.

A distributed computing environment can be setup in a much larger scale with hundreds to thousands of servers. The challenge of running parallel jobs in a distributed computing environment is how to integrate the parallel engine with the distributed engine, as each may have their own specific run models. The parallel engine supports the process-based model, while the distributed engine supports the task-based model. One solution is to develop a high level abstraction layer which encapsulates different run mechanisms. This layer is responsible for detecting which execution engine is used at run time. If it is the parallel engine, this layer then invokes the parallel run mechanism; otherwise, this layer invokes the distributed run mechanism. The problem with this solution is that it needs to maintain two sets of libraries for the same processing logic. The processing logic of a parallel operator must be re-implemented using the APIs provided by the distributed run mechanism. This requires a lot of time and effort for development and maintenance work. For example, to implement data integration on a distributed engine, one would have to implement transformation, data aggregation, and joins using the distributed APIs.

Accordingly, it is necessary to find an efficient solution that can be used to deploy parallel data integration applications to a distributed computing environment without re-implementing core data processing logic such as data transformation, aggregation, pivoting, and joining

SUMMARY

Embodiments disclosed herein provide a system, method, and computer program product to process parallel computing tasks on a distributed computing system, by computing an execution plan for a parallel computing job to be executed on the distributed computing system, the distributed computing system comprising a plurality of compute nodes, generating, based on the execution plan, an ordered set of tasks, the ordered set of tasks comprising: (i) configuration tasks, and (ii) execution tasks for executing the parallel computing job on the distributed computing system, and launching a distributed computing application to assign the tasks of the ordered set of tasks to the plurality of compute nodes to execute the parallel computing job on the distributed computing system.

DETAILED DESCRIPTION

Figure 1:
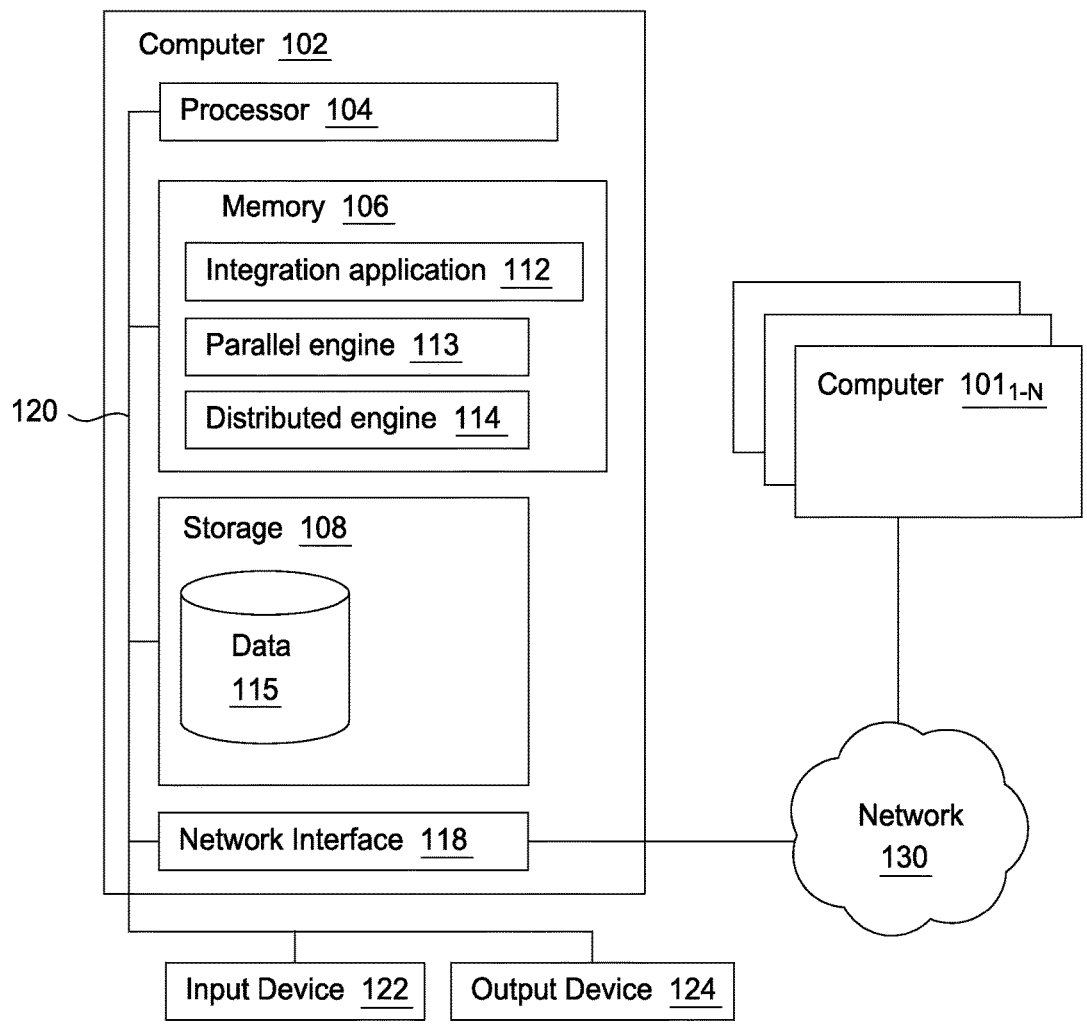
FIG. 1 is a block diagram illustrating a system for deploying parallel data integration applications to distributed computing environments, according to one embodiment disclosed herein.

Embodiments disclosed herein support execution of parallel computing jobs in a distributed computing environment. An integration application is responsible for generating a plan comprising a set of tasks based on parallel job information. The integration application may model a parallel (partial) data flow, and drive it to run on the distributed engine. The integration application then runs the plan by interacting with the distributed engine. Using a task-based model, the parallel data flow may be described as a series of distributed tasks in an execution plan, which are then executed in the data flow order specified in the execution plan.

Embodiments disclosed herein utilize a single parallel engine to support both the process-based model (parallel computing jobs), and a task-based model (distributed computing jobs). The model may be determined based on the run time computing environment. In the task-based model, the execution plan of a parallel job defines a list of tasks, and what is to be executed by each task, as well as the execution sequence of the distributed tasks. A task may be considered to be a driver to one or more parallel operators. The tasks provide two main functions, task configuration and task execution. The configuration tasks are responsible for setting up the run time environment, including loading the dynamic library of the parallel operator and creating the socket channels for communication between the task run program and the separate parallel operator processes. The execution tasks are responsible for starting parallel operators, monitoring their execution, passing input data to the parallel operators, and receiving output data from the parallel operators.

Advantageously, embodiments disclosed herein do not re-implement the parallel run mechanism using another set of APIs, as existing parallel processing code can be reused. Therefore, any parallel operators built on top of the parallel engine may run on the distributed engine without modification. This allows functional components such as information analyzers, data quality tools, data ETL tools, and data connectivity tools, to be deployed to the distributed environment without losing any existing capabilities. Furthermore, existing parallel jobs can run on the distributed engine without needing modification. Additionally, no difference will be perceptible to a user designing jobs.

The Apache® Hadoop® framework, or similar software may be used herein as an exemplary distributed computing environment, however, this is for illustrative purposes only, as embodiments disclosed herein are compatible with any parallel or distributed computing environments, presently known or unknown. Any discussion of the Hadoop framework should not be considered limiting of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the integration application could execute on a computing system in the cloud and execute parallel computing jobs in distributed computing environments. In such a case, the integration application could create a plan for executing the parallel computing job in the distributed computing environment and store the plan and execution output at a storage location in the cloud. Doing so allows a user to access this information from any computing system attached to a network connected to the cloud (e.g., the Internet). Additionally, data integration may now be offered as a service in a cloud environment where the backend runs on the distributed engine.

FIG. 1 is a block diagram illustrating a system 100 for deploying parallel data integration applications to distributed computing environments, according to one embodiment disclosed herein. The computer 102 may also be connected to a plurality of other computers $102_{1-N}$ via a network 130. The computers $102_{1-N}$ may be other computers in a distributed or parallel computing environment. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist in multiple levels, from high speed registers and caches to lower speed but larger DRAM chips. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 122 may be any device for providing input to the computer 102. For example, a keyboard, a mouse, a touchpad, voice commands, or any combination thereof may be used. The output device 124 may be any device for providing output to a user of the computer 102. For example, the output device 124 may be any display screen or set of speakers. Although shown separately from the input device 122, the output device 124 and input device 122 may be combined. For example, a display screen with an integrated touch-screen may be used.

As shown, the memory 106 contains the integration application 112, which is an application generally configured to deploy parallel computing jobs to a distributed computing environment for execution. The integration application 112 determines the platform on which compute jobs are to be executed, generates an execution plan, configures the platform for execution of the plan, and monitors the execution of the plan. The memory 106 also contains the parallel engine 113, which generally is an application configured to manage the execution parallel computing jobs, and the distributed engine 114, which generally is an application configured to manage the execution of distributed computing jobs. As shown, storage 108 contains data 115, which stores data related to the integration application 112, as well as the parallel engine 113 and distributed engine 114. For example, the data 115 may include configuration data, task data, and plan data. Although depicted as a database, the data 115 may take any form sufficient to store data, including text files, xml data files, and the like. In some embodiments, the data 115, as well as the integration application 112, the parallel engine 113, and the distributed engine 114 may be in any number of different computers, in the same computer, or any combination thereof.

Figure 2:
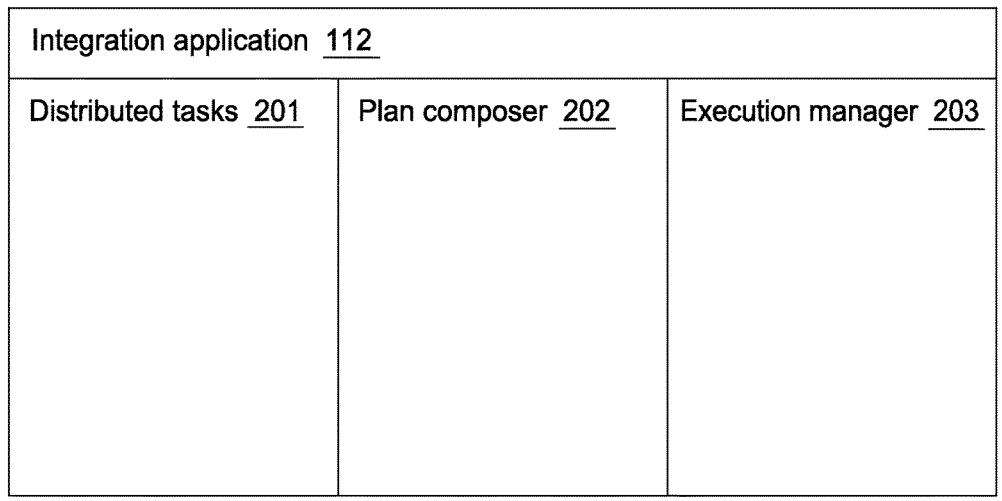
FIG. 2 is a block diagram illustrating components of an integration application for deploying parallel data integration applications to distributed computing environments, according to one embodiment disclosed herein.
Figure 2:

FIG. 2 is a block diagram 200 illustrating components of an integration application for deploying parallel data integration applications to distributed computing environments, according to one embodiment disclosed herein. As shown, the integration application 112 may include distributed tasks 201, a plan composer 202, and an execution manager 203. Generally, the plan composer 202 is responsible for generating an execution plan of distributed tasks based on parallel job information. The execution manager 203 is generally responsible for running the plan by interacting with the distributed engine. The distributed tasks 201 are generally used for modeling a parallel (partial) data flow and driving it to run on the distributed engine. In one embodiment, the distributed tasks 201 comprise execution tasks and configuration tasks. Using a task-based model, the parallel data flow may be described as a series of distributed tasks which are then executed in the data flow order.

A distributed task 201 may support two high level functions—handling configuration and launch of the job, as well as monitoring and managing data communication during execution. Therefore, a distributed task 201 may be viewed as being a configuration task or an execution task. For a distributed task 201 that implements the Hadoop MapReduce model, data processing is aided by a task mapper job PXMapper and a reducer job PXReducer. Each MapReduce job may wrap PXOperator data processing logic. A PXOperator may consist of two modules—a connection module and a run module. A configuration distributed task 201 applied against a MapReduce model configures the MapReduce tasks, including setting the parameters to run the task. Example parameters include, but are not limited to, plan file path, parallel configuration file path, conductor port number, run time environment variables for the parallel operator, node id numbers for nodes hosting mappers and reducers, output dataset directories, input counts, player ids, a Hadoop DistributedCache for the plan, and hosts file for Hadoop. A configuration distributed task 201 may also launch the MapReduce task by invoking PXMapper/PXReducer, which further starts a separate process to run a single PXOperator or a combined operator and controller. PXMapper may also run multiple non-combined PXOperators/controllers. Another configuration distributed task 201 may create interconnections between PXOperator processes and PXMappers/PXReducers. An execution distributed task 201 may cause the PXMapper/PXReducer to pass data with PXOperator processes for actual data processing, and finally wait on the MapReduce job to complete. Although these distributed tasks 201 have been explicitly described, by way of example, many other distributed tasks may be provided by the integration application 112.

As previously indicated, a MapReduce task may include two subtasks, a Map task and a Reduce task. The map task may include, but is not limited to, an API to instantiate the Map task, an index to the execution plan for the operator to be run by the task, a number of input datasets for the PXOperator, a number of output datasets for the PXOperator, an API to instantiate the mapper record reader, an API to instantiate the mapper input format, and an API to override default partitioning. The Reduce task may include, but is not limited to an API to instantiate the Reduce task, an index to the execution plan for the operator to be run by the task, a number of input datasets for the PXOperator, a number of output datasets for the PXOperator, an API to instantiate the reducer record writer, and an API to instantiate the reducer output format.

A distributed task 201, therefore, may serve as the main interface point for a parallel operator. A distributed task 201 handles parsing command arguments, sets configuration parameters, defines input and output formats, and launches the configured MapReduce job. In doing so, the distributed task 201 may create three different types of sockets, a control socket, an input socket, and an output socket. A MapReduce task may maintain two individual threads for managing these connections. One thread may be dedicated to control and input, and another thread may be used for output. The control thread reads key/value input and writes it to input sockets. The control thread may also check for status updates from a PXOperator through the control socket. If a PXOperator does not take any input data, it may not be necessary to create the input socket, and the control thread remains responsible for only checking operator status. If a PXOperator takes multiple inputs, there may be multiple input sockets connecting the PXMapper and the PXOperator. The control thread would then write key/value input to the specific input which data belongs to. The output thread may read output records from the PXOperator until the end of file is reached. It may be a typical scenario where a MapReduce task only contains the mapper job, while the reducer job may be omitted per the processing logic. In such a case, it is not necessary to create the output thread and the output socket connection. If the reducer job is present, the output thread uses the output socket for reading output records.

A connection module provided by the PXOperator may be responsible for accepting the connections created by the PXMapper/PXReducer, and loads the execution plan after the connections are established. A run module of a PXOperator may be responsible for processing input data, and producing output data. The run module reads input data from PXMapper/PXReducer, and writes output data back to the PXMapper/PXReducer. A PXOperator may have a connection module which communicates with a Hadoop PXMapper or PXReducer through a control socket. A PXOperator may exchange input and output data with PXMapper/PXReducer through its own PX IO manager. A run module of a PXOperator is the core of a distributed task 201, and remains independent of the rest of the task, and its only connection is a data socket. This independence allows the PXOperator to run on any type of computing environment without needing to be changed.

Figure 3:
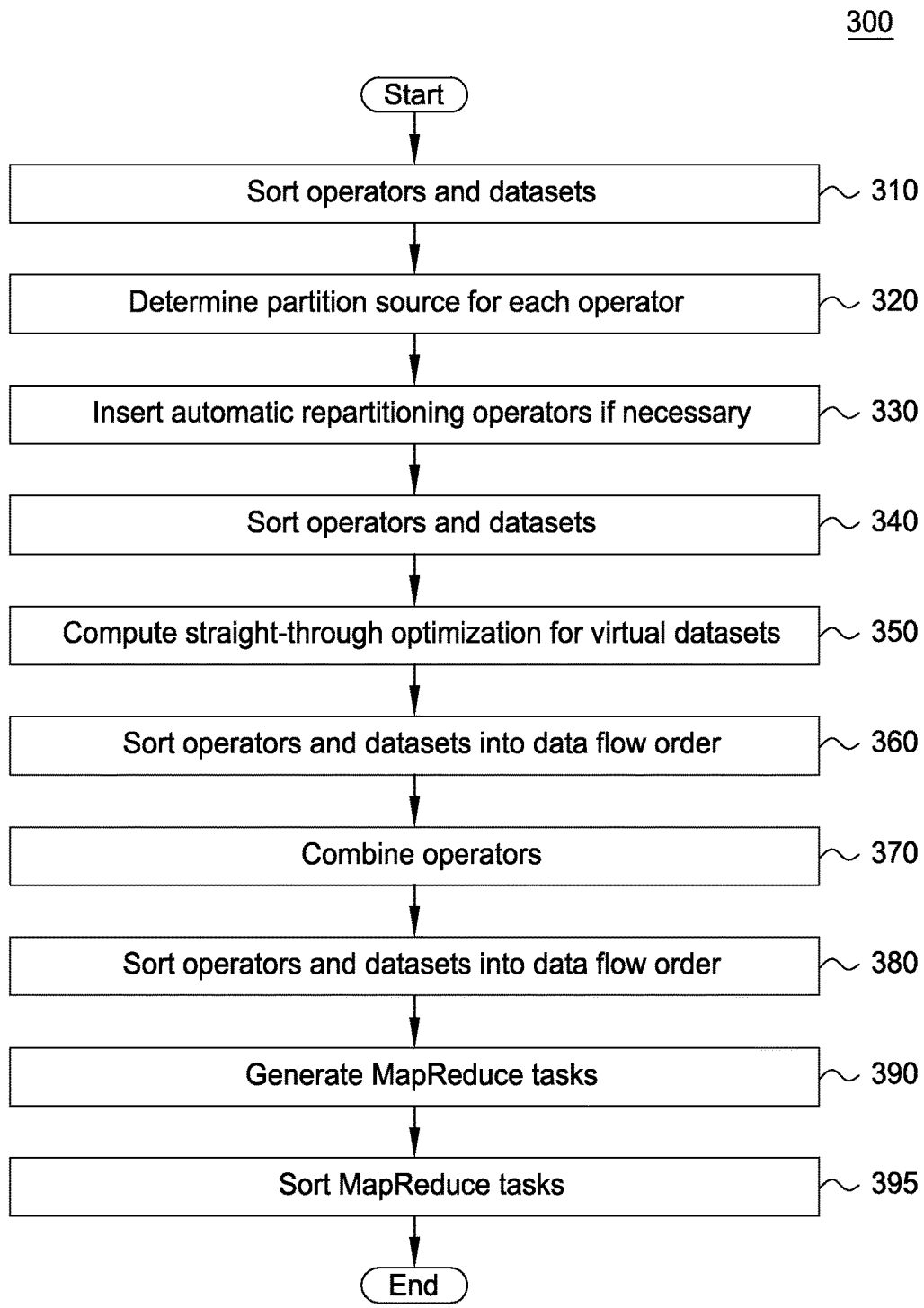
FIG. 3 is a flow chart illustrating a method for generating an execution plan, according to one embodiment disclosed herein.

The plan composer 202 may require two phases to generate a MapReduce execution plan. In the first phase, the plan composer 202 may generate a parallel score based on the parallel computing job. In the second phase, the plan composer may parse the generated parallel score to map the resulting set of operators and combined controllers to a set of MapReduce tasks. Turning now to FIG. 3, a method 300 is depicted for generating an execution plan, according to one embodiment disclosed herein. In one embodiment, the plan composer 202 may perform the steps of the method 300 to generate the MapReduce execution plan. At step 310 the plan composer 202 may sort operators and datasets of the parallel execution plan. At step 320, the plan composer 202 may identify partition sources for each operator. The partition source may be sequential, the operator itself, input data splits, default, or an upstream operator. At step 330, the plan composer 202 inserts automatic repartitioning operators and datasets if necessary. At step 340, the plan composer 202 again sorts through the operators and datasets. At step 350, the plan composer 202 may compute the straight-through optimization for virtual datasets. At step 360, the plan composer 202 sorts the operators and datasets into the correct data flow order. At step 370, the plan composer 202 combines operators, if possible, while considering natural splits between Map and Reduce functions (such as sorting and partitioning) to reduce the total count of MapReduce tasks. At step 380, the plan composer 202 again sorts the operators and datasets into data flow order, as combining the operators in step 370 involves inserting and deleting operators. At step 390, the plan composer 202 generates MapReduce tasks that will be used as the execution plan to drive the operators of the parallel job at runtime. At step 395, the plan composer 202 sorts the MapReduce tasks in execution order, and saves the tasks to the execution plan, along with other Hadoop specific information required to run the tasks. In one embodiment, the execution plan is stored in the data 115.

Returning to FIG. 2, the execution manager 203 is responsible for running the parallel plan or the distributed execution plan (i.e., the MapReduce plan generated by the plan composer 202), depending on the target execution environment. To run the MapReduce plan, the execution manager 203 may handle launching and monitoring of each MapReduce task that has been configured in the MapReduce plan. The execution manager 203 may launch MapReduce tasks by executing a distributed task 201 to configure and submit the Hadoop Map and Reduce tasks to be run. The distributed task 201 for this purpose is composed of a main function that is responsible for configuring and launching the MapReduce task, and contains the APIs necessary to implement MapReduce tasks.

Figure 4:
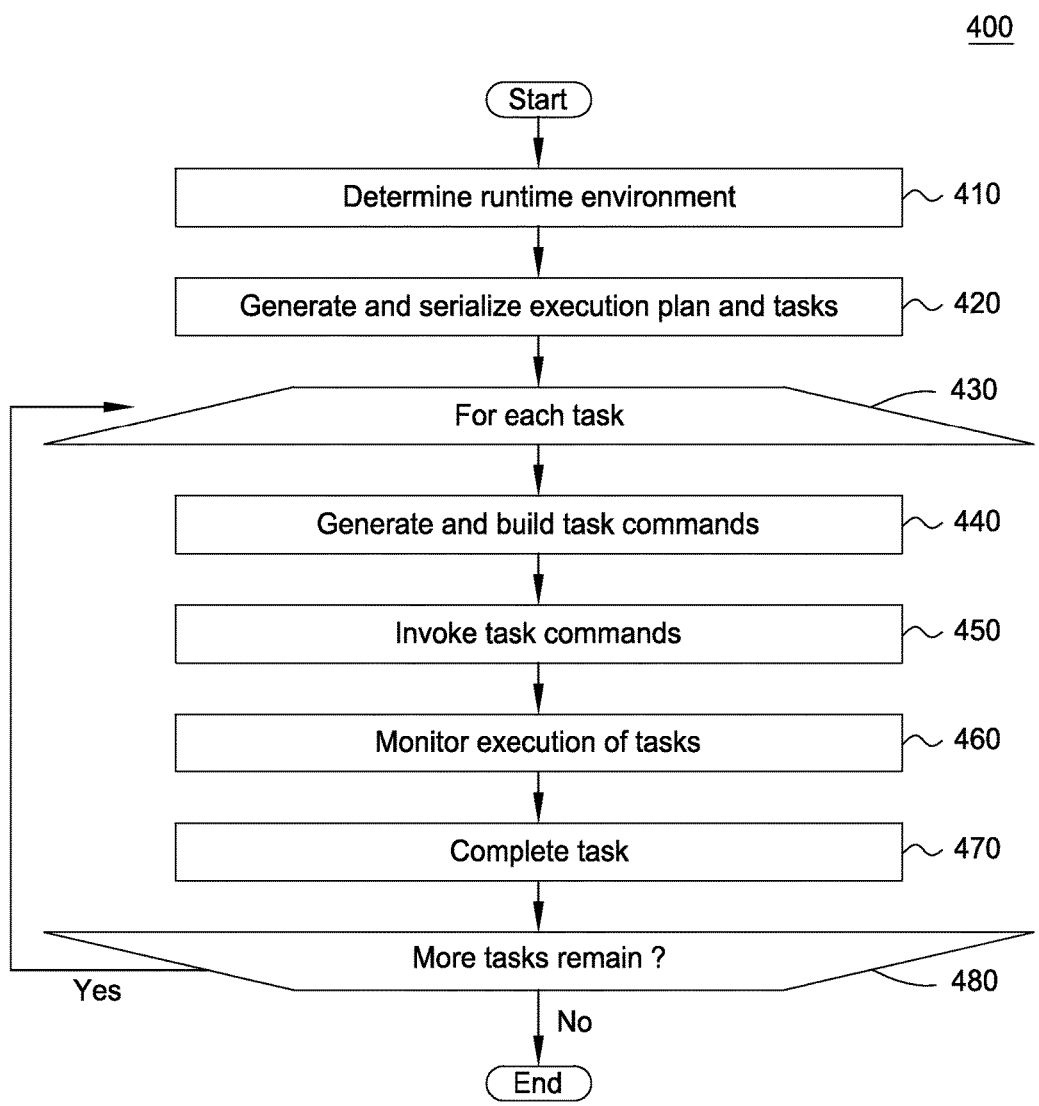
FIG. 4 is a flow chart illustrating a method for deploying parallel data integration applications to distributed computing environments, according to one embodiment disclosed herein.

FIG. 4 is a flow chart illustrating a method 400 for deploying parallel data integration applications to distributed computing environments, according to one embodiment disclosed herein. Generally, the method 400 allows for the execution of a parallel computing job on a distributed computing platform. In one embodiment, the integration application 112, or a designated component thereof, performs the steps of the method 400. In such an embodiment, at step 410, the integration application 112 determines the runtime environment of the target processing engine. In one embodiment, this step comprises determining whether the target engine is a distributed computing engine or a parallel computing engine. If the target engine is a parallel processing (or computing) engine, the integration application 112 may cause an execution plan to be started on the parallel engine. If the target engine is a distributed computing engine, the integration application 112 may cause an execution plan, generated at step 420, to be started in the distributed computing engine. For the purpose of discussing embodiments disclosed herein, it will be assumed that the target engine is a distributed computing engine.

At step 420, the integration application 112 generates and serializes an execution plan, as well as the tasks that make up the execution plan. Generation of the execution plan was discussed with reference to FIG. 3. Serialization of the execution plan may include serializing to a file containing the PXOperators of the flow and saving the file to the data 115 shown in FIG. 1. The serialized file may be passed to each MapReduce job using the Hadoop DistributedCache mechanism. At run time, the file may be read from DistributedCache and used to load the correct PXOperator to be run based on the index of the operator. The contents of the serialized file may include information on each Mapper, Reducer, Partitioner, and sort options required to configure and run the MapReduce tasks that will drive the PXOperators. At step 430, the integration application 112 begins executing a loop containing steps 430-480 for each task in the execution plan. At step 440, the integration application 112 generates and builds task commands. At step 450, the integration application 112 invokes the task commands on the distributed computing engine. At step 460, the integration application 112 monitors execution of the tasks by the distributed computing engine. At step 470, the integration application 112 waits for the distributed computing engine to complete the task. At step 480, the integration application 112 determines whether more tasks remain in the execution plan. If more tasks remain, the integration application 112 returns to step 430. Otherwise, the method 400 ends.

Figure 5:
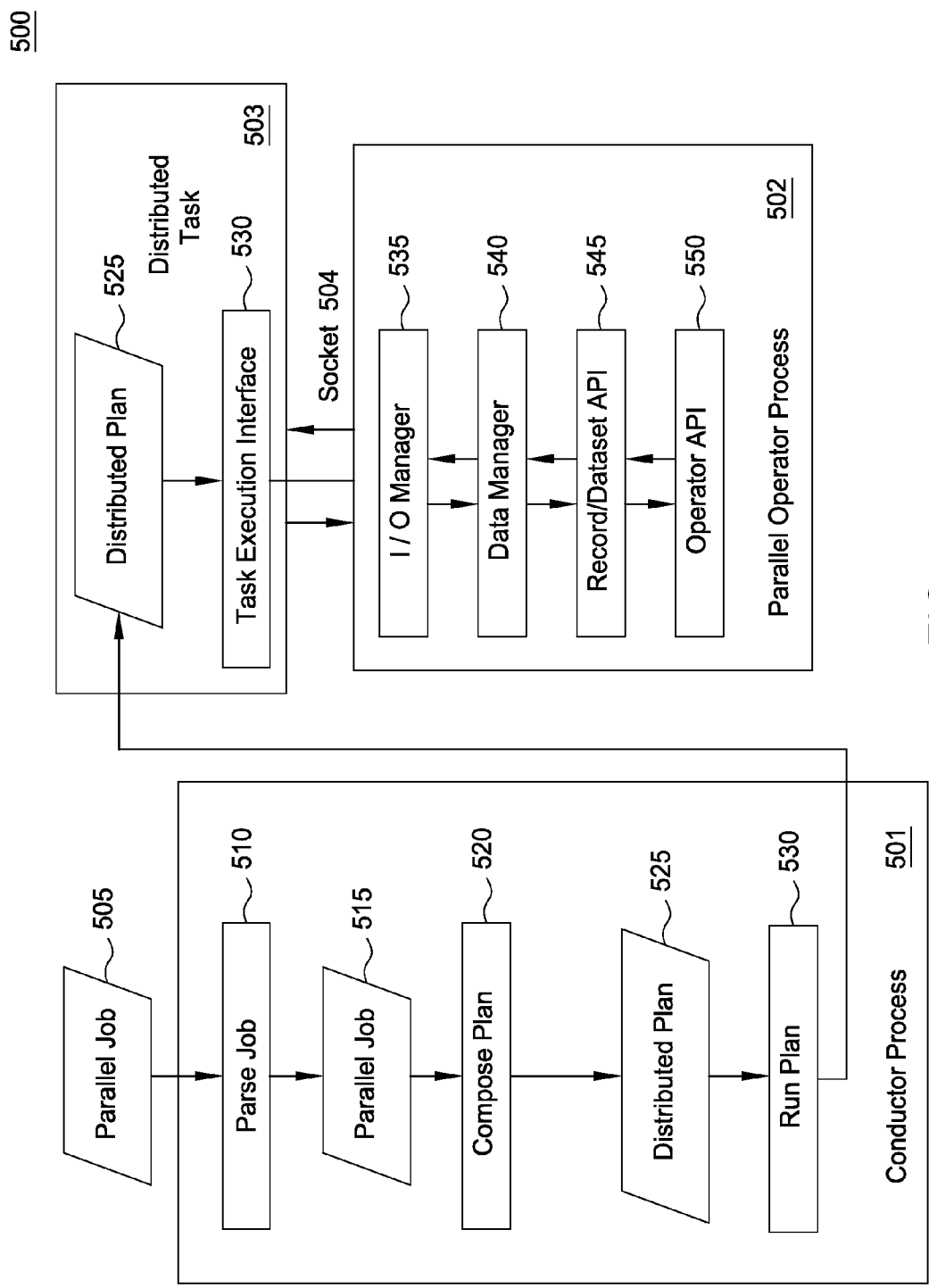
FIG. 5 is a block diagram illustrating techniques for parallel job execution flow on a distributed engine, according to one embodiment disclosed herein.

FIG. 5 is a block diagram 500 illustrating techniques for parallel job execution flow on a distributed engine, according to one embodiment disclosed herein. Generally, the block diagram 500 illustrates the execution flow orchestrated by the integration application 112 to execute a parallel computing job on a distributed computing engine. The block diagram 500 includes several components, including a conductor process 501, a parallel operator process 502, and a distributed task 503. As shown, a parallel computing job 505 is parsed by the integration application 112 in block 510, which produces a plurality of job objects 515. These job objects may be composed at block 520, which are then used to generate a distributed execution plan 525. The distributed execution plan may then be run at block 530. The parallel operator process 502 includes an IO manager 535, which allows the parallel operator process to communicate, through one or more sockets 504, with the task execution interface 530 of the distributed task 503. The distributed plan 525 is executed by one or more of the parallel operators 502. As shown, the parallel operator process 502 also includes a data manager 540, a record/dataset API 545, and an operator API 550.

Figure 6:
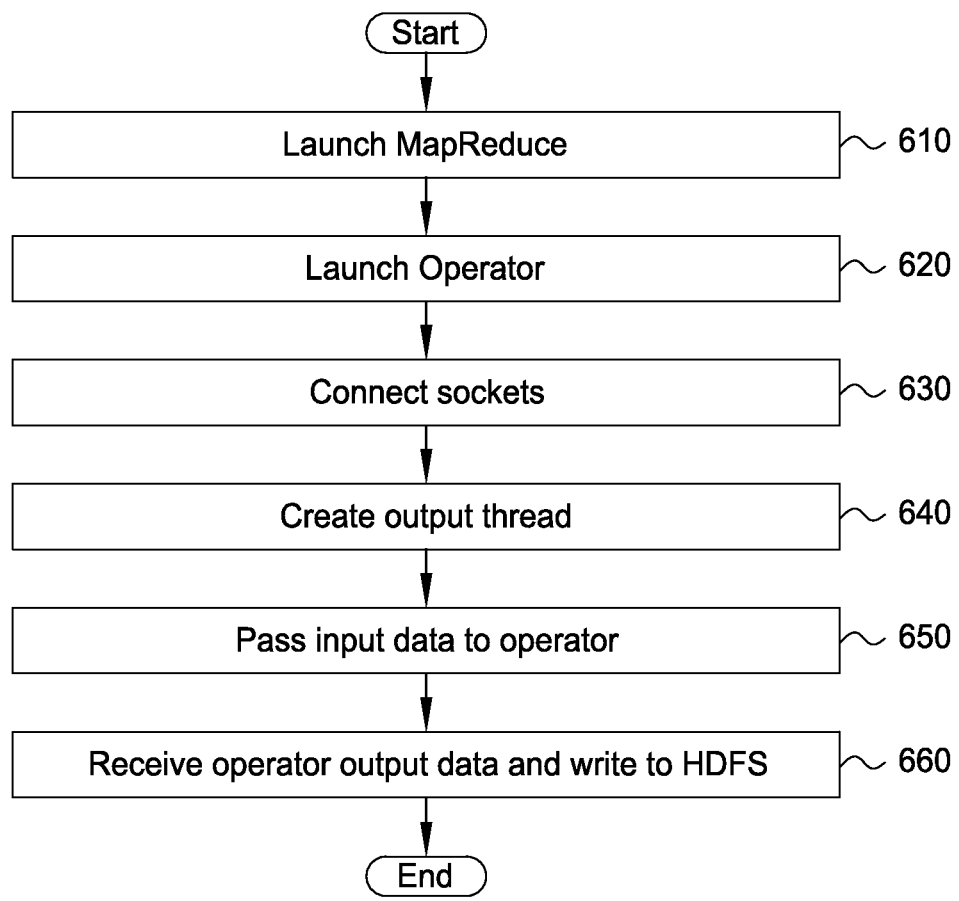
FIG. 6 is a flow chart for a distributed job lifecycle, according to one embodiment disclosed herein.

FIG. 6 is a flow chart 600 for a distributed job lifecycle, according to one embodiment disclosed herein. In one embodiment, the distributed job is a MapReduce task orchestrated by the integration application 112, or a designated component thereof. At step 610, the integration application 112 launches a MapReduce task. At step 620, the integration application 112 launches a PXOperator. At step 630, the integration application 112 connects sockets, which may comprise a control socket, input sockets, and an output socket. At step 640, the integration application 112 creates an output thread for the output of the PXOperator. At step 650, the integration application 112 passes input data to the PXOperator. The PXOperator may then process the input data. At step 660, the integration application 112 receives output data from the PXOperator, and writes the output data to a file system, such as the Hadoop Distributed File System (HDFS).

Figure 7:
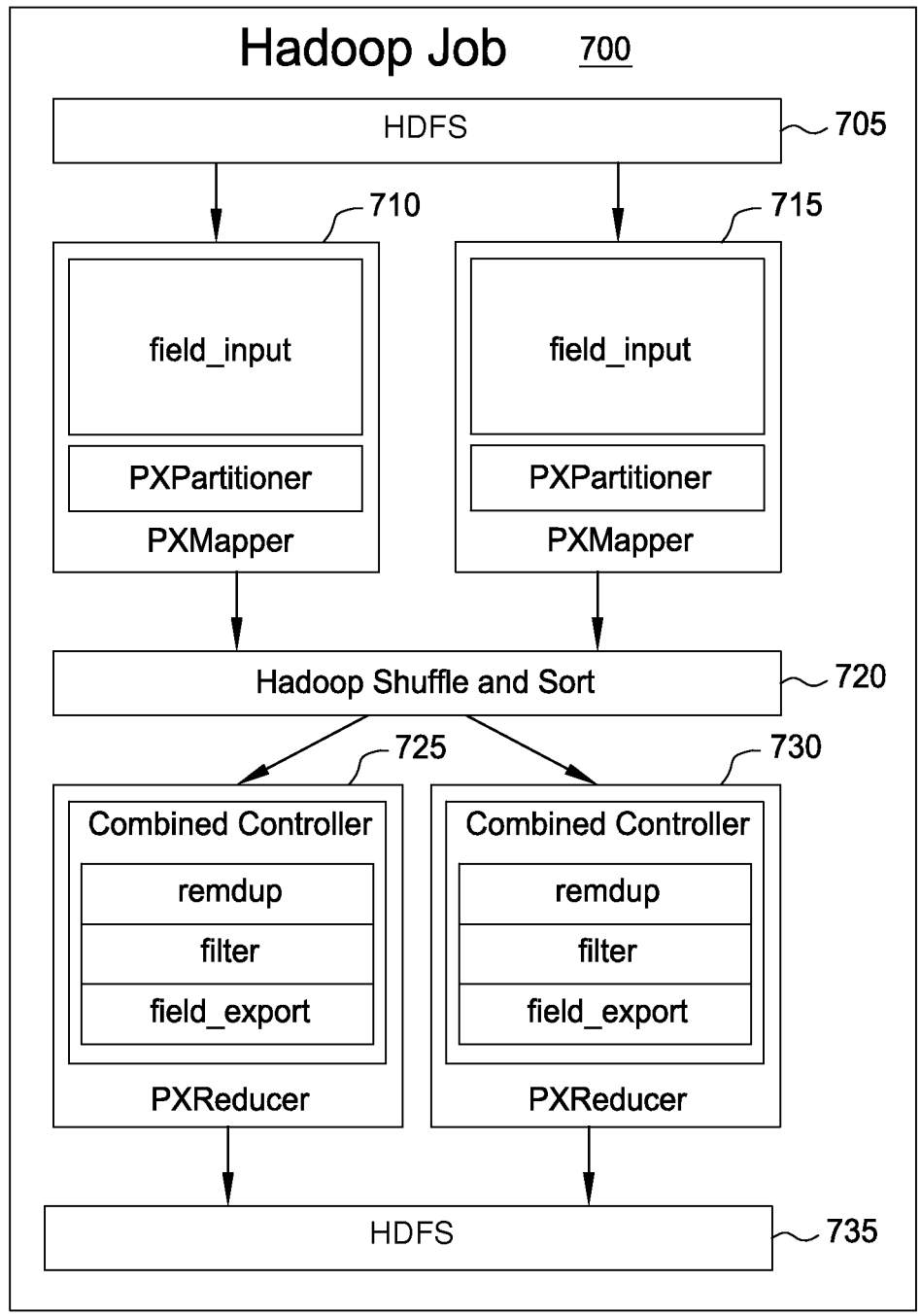
FIG. 7 is a block diagram illustrating a first deployment of a parallel computing job in a distributed computing environment, according to one embodiment disclosed herein.

FIG. 7 is a block diagram 700 illustrating a first deployment of a parallel computing job in a distributed computing environment, according to one embodiment disclosed herein. FIG. 7 represents an output of the plan composer 202 when given a parallel computing job that reads integer data from an HDFS, removes duplicated records, and writes unique records back to the HDFS. In FIG. 7, the parallel computing job is configured such that the input data file is split over two blocks. This split determines the partitioning of the rest of the job. The MapReduce framework defines how the data is split based on the default input format and the source file being read. FIG. 7 depicts a configuration where multiple parallel operators are combined into a single PXReducer. The output of the MapReduce framework is the Hadoop Job 700. An HDFS 705 stores the integer data. Two PXMappers 710 and 715 include PXPartitioners and field_import operators, which import the data from HDFS 705. The output of the PXMappers 710 and 715 are passed to a Hadoop shuffle and sort 720, which shuffles and sorts the data, and passes it to PXReducers 725 and 730. PXReducers 725 and 730 include CombinedControllers, which are the operators that have been aggressively combined by the plan composer 202 when generating the execution plan. The CombinedControllers include remdup, filter, and field_export operators. The remdup operators are configured to remove the duplicate records from the data. The filter operators create a set of unique records from the various data sets generated by the Hadoop compute nodes. The field_export operators are configured to generate the output, which is saved to HDFS 735.

Figure 8:
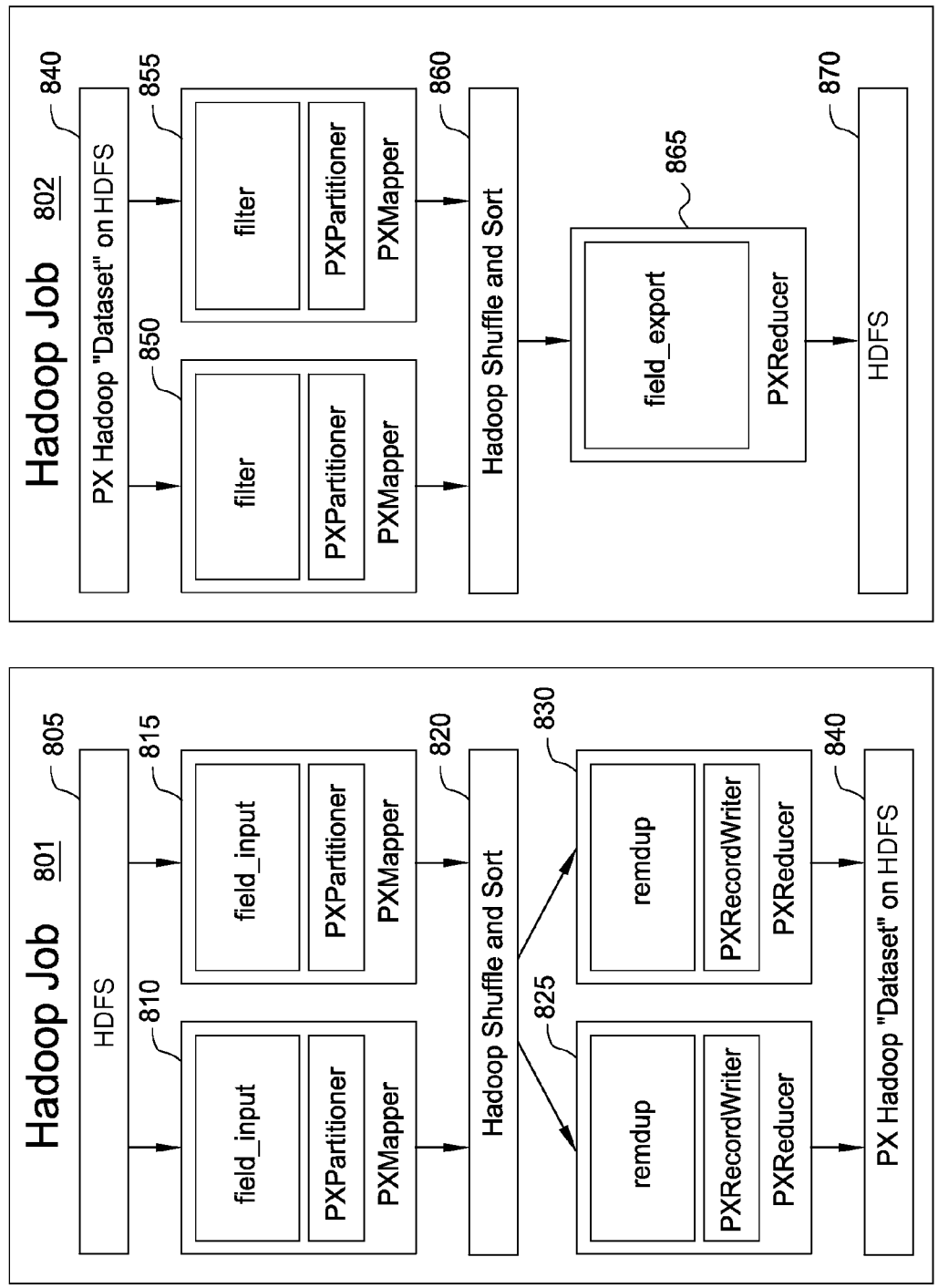
FIG. 8 is a block diagram illustrating a second deployment of a parallel computing job in a distributed computing environment, according to one embodiment disclosed herein.

FIG. 8 is a block diagram 800 illustrating a second deployment of a parallel computing job in a distributed computing environment, according to one embodiment disclosed herein. FIG. 8 represents an output of the plan composer 202 when given a parallel computing job that reads integer data from an HDFS, removes duplicated records, and writes unique records back to the HDFS. However, unlike FIG. 7, the operators in FIG. 8 have not been combined in order to illustrate how intermediate datasets are supported by embodiments of the disclosure. In FIG. 8, the parallel computing job is configured such that the input data file is split over two blocks. This split determines the partitioning of the rest of the job. The MapReduce framework defines how the data is split based on the default input format and the source file being read. As shown, the MapReduce framework creates two jobs, Hadoop Job 801 and 802. With reference to Hadoop Job 801, an HDFS 805 stores the integer data. Two PXMappers 810 and 815 include PXPartitioners and field_import operators, which import the data from HDFS 805. The output of the PXMappers 810 and 815 are passed to a Hadoop shuffle and sort 820, which shuffles and sorts the data, and passes it to PXReducers 825 and 830. PXReducers 825 and 830 include PXRecordWriters, which write records to the HDFS 840, and remdup operators, which are operators configured to remove the duplicate records from the data. The output of the remdup operators, a PX Hadoop dataset without duplicate integers, may then be written to HDFS 840.

Hadoop job 802 begins with the PX Hadoop dataset 840 being filtered by filer operators in PXMappers 850 and 855. The output of the filter operators is then passed to a Hadoop shuffle and sort 860, which then passes the data records to the PXReducer 865. The PXReducer 865 includes a field_export operator, the output of which is written to HDFS 870. Advantageously, the field_export operator generates a final flat file export, which may be run in a single Reduce task to produce a single file, as would be done by default in a parallel computing job.

Advantageously, embodiments disclosed herein re-implement parallel run mechanisms on distributed computing engines using a new set of APIs. Therefore, existing parallel processing code may be reused on the distributed computing engine without needed to be modified. Furthermore, existing parallel jobs may run on the distributed computing engine without modification. Embodiments disclosed herein make it possible to run more jobs concurrently, as parallel processing jobs no longer need to wait in a queue for resources to become available. Data streaming software may be enhanced by embodiments disclosed herein by applying rich data integration functionality, such as data cleaning, data analysis, data transformation, and data movement. Furthermore, a failed job may now resume where it failed such that the entire job need not be re-started. This feature is especially useful for a long running job that has processed a large amount of data when one of the stages in the data flow fails. In addition, embodiments disclosed herein provide fast local access to the files on the distributed file system. Finally, embodiments disclosed herein allows for future development of more data integration operators using existing parallel computing APIs and the same functions will be automatically reused when running in distributed computing environment.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method to process parallel computing tasks on a distributed computing system, comprising:
 computing, by an integration application, an execution plan for a parallel computing job comprising a set of parallel processing operators to be executed on the distributed computing system, the distributed computing system comprising a plurality of compute nodes, each computing node having a distinct memory;
 generating, by the integration application, based on the execution plan, an ordered set of tasks specifying a sequence for executing the set of parallel processing operators of the parallel computing job on the distributed computing system, wherein each of the ordered set of tasks is a driver to at least one parallel processing operator of the set of parallel processing operators, wherein the at least one parallel processing operator is executed on the distributed computing system without modification, and wherein the ordered set of tasks comprises:
 (i) one or more configuration tasks, wherein each configuration task includes loading a dynamic library of the at least one parallel processing operator and creating at least one socket channel for communication between each configuration tasks and the at least one parallel processing operator, and
 (ii) one or more execution tasks for executing the at least one parallel processing operator; and
 launching a distributed computing application to assign the tasks of the ordered set of tasks to the plurality of compute nodes to execute the parallel computing job on the distributed computing system.

2. The method of claim 1, further comprising:
 determining, based on the distributed computing system being a run time computing environment for the parallel computing job, that the parallel computing job is to be executed on the distributed computing system, and not a parallel computing system.

3. The method of claim 1, wherein the one or more execution tasks include: (i) starting the at least one parallel operator, (ii) monitoring an execution of the at least one parallel processing operator, (iii) passing input data to the at least one parallel processing operator, and (iv) receiving output data from the at least one parallel processing operator.

4. The method of claim 1, further comprising: responsive to detecting, at a point of failure, a failure in execution of the parallel computing job on the distributed computing system, resuming execution of the parallel computing job on the distributed computing system at the point of failure, without having to restart execution of the parallel computing job on the distributed computing system.

\* \* \* \* \*